(12) United States Patent
Lee et al.

(10) Patent No.: US 10,797,391 B2
(45) Date of Patent: Oct. 6, 2020

(54) ELECTRONIC DEVICE INCLUDING ANTENNA MODULE

(71) Applicant: Samsung Electronics Co., Ltd., Gyeonggi-do (KR)

(72) Inventors: Jongpil Lee, Gyeonggi-do (KR); Byungjoon Kim, Gyeonggi-do (KR); Wonseob Kim, Gyeonggi-do (KR); Heejin Park, Gyeonggi-do (KR); Hyunchul Hong, Gyeonggi-do (KR); Sungchul Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/687,881

(22) Filed: Nov. 19, 2019

(65) Prior Publication Data

US 2020/0161763 A1    May 21, 2020

(30) Foreign Application Priority Data

Nov. 19, 2018 (KR) .................. 10-2018-0142801

(51) Int. Cl.
*H01Q 5/314* (2015.01)
*H04B 1/40* (2015.01)
*H01Q 21/06* (2006.01)

(52) U.S. Cl.
CPC ............. *H01Q 5/314* (2015.01); *H01Q 21/06* (2013.01); *H04B 1/40* (2013.01)

(58) Field of Classification Search
CPC .......... H01Q 5/314; H01Q 21/06; H04B 1/40
USPC .......................................................... 455/73
See application file for complete search history.

(56) References Cited

U.S. PATENT DOCUMENTS

| 8,063,847 | B2* | 11/2011 | Du ........................ H01Q 1/38 343/799 |
|---|---|---|---|
| 8,175,524 | B2 | 5/2012 | Sathath |
| 10,284,364 | B2 | 5/2019 | Park et al. |
| 10,297,900 | B2 | 5/2019 | Lee et al. |

(Continued)

FOREIGN PATENT DOCUMENTS

| EP | 3379647 A1 | 9/2018 |
|---|---|---|
| KR | 10-2009-0099235 A | 9/2009 |

(Continued)

OTHER PUBLICATIONS

European Search Report dated Mar. 5, 2020.
International Search Report dated Mar. 19, 2020.

*Primary Examiner* — Lee Nguyen
(74) *Attorney, Agent, or Firm* — Cha & Reiter, LLC.

(57) ABSTRACT

Disclosed herein is an electronic device. The electronic device may include an electronic device may comprising a housing, a first PCB disposed inside the housing, a first wireless communication circuit disposed on the first PCB to transmit and receive signals of a first frequency band, a second PCB disposed inside the housing, wherein the second PCB includes a signal line, an antenna array disposed on the second PCB, a second wireless communication circuit disposed on the second PCB to transmit and receive a signal of a second frequency band using the antenna array, and a conductive member electrically connected to the first wireless communication circuit by the signal line of the second PCB via a feed point for the conductive member.

20 Claims, 12 Drawing Sheets

(56) References Cited

U.S. PATENT DOCUMENTS

| | | |
|---|---|---|
| 10,340,592 B2 | 7/2019 | Nam et al. |
| 10,439,267 B2 | 10/2019 | Seo et al. |
| 2007/0275660 A1 | 11/2007 | Sathath |
| 2009/0231202 A1 | 9/2009 | Kim et al. |
| 2017/0201014 A1 | 7/2017 | Lee et al. |
| 2017/0214519 A1 | 7/2017 | Park et al. |
| 2018/0034148 A1 | 2/2018 | Nam et al. |
| 2018/0277929 A1 | 9/2018 | Seo et al. |
| 2019/0273308 A1 | 9/2019 | Lee et al. |
| 2019/0312336 A1 | 10/2019 | Son et al. |

FOREIGN PATENT DOCUMENTS

| | | |
|---|---|---|
| KR | 10-2016-0031234 A | 3/2016 |
| KR | 10-2018-0006653 A | 1/2018 |
| KR | 10-2018-0013615 A | 2/2018 |

\* cited by examiner

ELECTRONIC DEVICE INCLUDING ANTENNA MODULE

CROSS-REFERENCE TO RELATED APPLICATION(S)

This application is based on and claims priority under 35 U.S.C. § 119 to Korean Patent Application No. 10-2018-0142801, filed on Nov. 19, 2018, in the Korean Intellectual Property Office, the disclosure of which is incorporated by reference herein its entirety.

BACKGROUND

1. Field

Embodiments disclosed herein relate to an electronic device including an antenna module.

2. Description of Related Art

Electronic devices such as smartphones or tablet PCs may perform various functions using wireless communication. Recently, electronic devices using a fifth generation (5G) communication technology using a high frequency band have been introduced. In the case of communications using signals in the high frequency band, a wavelength of the signals may be shortened and can use a wider bandwidth than previous generations of communications, allowing for the rapid transmission or reception of large amounts of information.

The above information is presented as background information only to assist with an understanding of the disclosure. No determination has been made, and no assertion is made, as to whether any of the above might be applicable as prior art with regard to the disclosure.

SUMMARY

In accordance with an aspect of the disclosure, an electronic device may comprising a housing; a first PCB disposed inside the housing; a first wireless communication circuit disposed on the first PCB to transmit and receive signals of a first frequency band; a second PCB disposed inside the housing, wherein the second PCB includes a signal line; an antenna array disposed on the second PCB; a second wireless communication circuit disposed on the second PCB to transmit and receive a signal of a second frequency band using the antenna array; and a conductive member electrically connected to the first wireless communication circuit by the signal line of the second PCB via a feed point for the conductive member.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

In the description of the drawings, the same or similar reference numerals may be used for the same or similar components.

DETAILED DESCRIPTION

The electronic device may include not only an antenna (hereinafter, mmWave antenna module) for high frequency band communication, but also an antenna (hereinafter, legacy antenna) for an existing communication technology (e.g., LTE, WiFi, or GPS). Legacy antennas may be implemented by a metal part such as a circuit board or a metal housing of the electronic device. When the mmWave antenna module is mounted together with existing legacy antennas, the mounting space of the antenna may be insufficient, and signal interference may occur with the existing antennas.

Certain aspects of the disclosure may address some of the above-mentioned problems and/or disadvantages and may provide some of the advantages described below. Accordingly, one aspect of the disclosure may provide an electronic device capable of mounting an mmWave antenna module and a legacy antenna in a limited internal space of the electronic device.

Hereinafter, certain embodiments of the disclosure may be described with reference to accompanying drawings. Accordingly, those of ordinary skill in the art will recognize that modification, equivalent, and/or alternative on the certain embodiments described herein can be variously made without departing from the scope of the disclosure.

Figure 1:
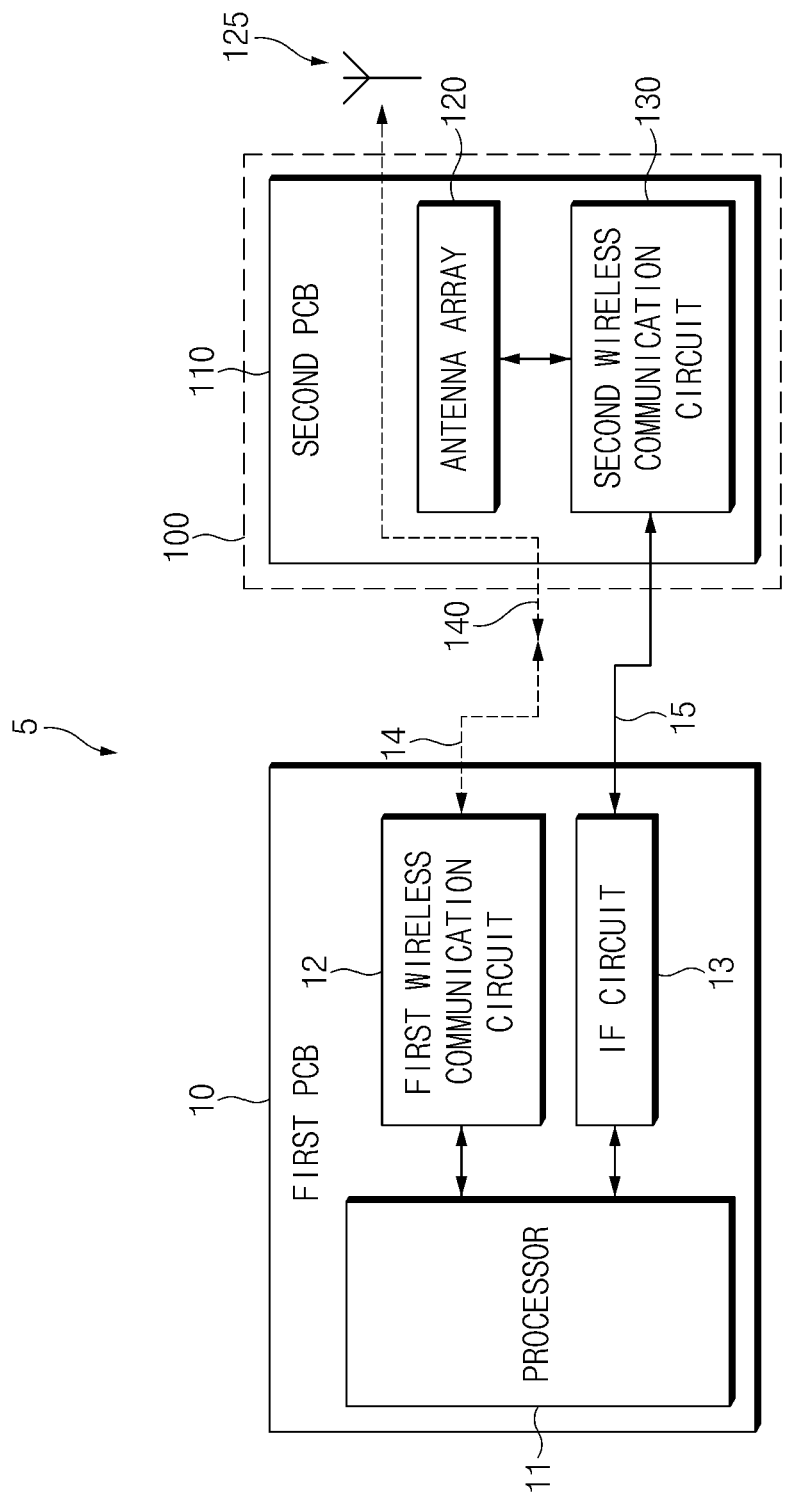
FIG. 1 illustrates a block diagram of an electronic device according to an embodiment.

FIG. 1 illustrates a block diagram of an electronic device according to an embodiment. The electronic device 5 can include a first PCB 10 and a second PCB 110. A first wireless communication circuit 12 is disposed on the first PCB 10 and configured to transmit and receive signals of a first frequency band. An antenna array 120 and second wireless communication circuit 130 are disposed on the second PCB 110. The second wireless communication circuit is configured to transmit and receive signals of a second frequency band using the antenna array 120. The second PCB 110 includes a signal line 140 electrically connecting the first wireless communication circuit 12 to a feed point of a conductive member 125. In certain embodiments, the conductive member 125 can act as a radiator and antenna.

Referring to FIG. 1, an electronic device 5 according to an embodiment may include at least one processor 11, a conductive member 125 acting as an antenna of a first frequency band (e.g., an LTE antenna, a sub-5G antenna, a WiFi antenna, or a Bluetooth antenna), and an mmWave antenna module 100 of the second frequency band (e.g., mmWave). In one embodiment, the first frequency band may be 6 GHz or less, and the second frequency band may be 6 GHz or more. For example, the second frequency band may include an mmWave band of from 24 GHz to 40 GHz. Hereinafter, the antenna of the first frequency band may be referred to as a first antenna.

The at least one processor 11 may be operatively connected to the mmWave antenna module 100 and the conductive member 125 acting as the first antenna, and may control operations of the mmWave antenna module 100 and the first antenna.

In one embodiment, the at least one processor 11 may include an application processor, and/or a communication processor. A communication processor (e.g., an LTE modem or a 5G modem) performing communication through the first antenna for transmitting and receiving a signal of a first frequency band and a communication processor (e.g., a 5G modem) performing communication through a second frequency band antenna may be separately implemented and may be implemented as one integrated communication circuit. The operation of the electronic device 5, a first wireless communication circuit 12, an IF circuit 13, and a second wireless communication circuit 130, which will be described below, may be controlled by the at least one processor 11.

In one embodiment, a first frequency band communication circuit (or first wireless communication circuit, e.g., an LTE or 5G wireless communication circuit) may include the first wireless communication circuit 12 and a conductive member 125 acting as a first radiator of the first antenna. The first wireless communication circuit 12 may be disposed on a first printed circuit board (PCB) (e.g., a main PCB) accommodated in the electronic device 5. Hereinafter, the printed circuit board is referred to as a PCB.

In one embodiment, the first wireless communication circuit 12 may transmit and/or receive a signal of a first frequency band using the conductive member acting as a first radiator 125.

In certain embodiments, the conductive member 125 may be act as a radiator. For example, the conductive member 125 may form a part of an outer surface (e.g., a housing) of the electronic device 5. Alternatively, the conductive member may be a conductive pattern disposed inside the electronic device 5. Accordingly, reference 125 will now be referred to as either the radiator or antenna, with the understanding that it is a conductive member.

In one embodiment, the mmWave antenna module 100 may include a second PCB 110, an antenna array 120, and the second wireless communication circuit 130. The antenna array 120 and the second wireless communication circuit 130 may be disposed on the second PCB 110. The antenna array 120 may include a plurality of antenna elements.

In one embodiment, the second wireless communication circuit 130 may be electrically connected to the IF circuit 13 disposed on the first PCB 10 through a signal line 15. The second wireless communication circuit 130 may convert an RF signal received from the antenna array 120 supporting a second frequency band into an intermediate frequency (IF) signal, and transfer the IF signal resulted from conversion to the IF circuit 13 through the signal line 15. The IF circuit 13 may convert the received IF signal into a baseband signal and transfer the baseband signal to the at least one processor 11.

In one embodiment, the electronic device 5 may include a signal line 14/140 electrically connecting feed points for the first wireless communication circuit 12 and the first radiator/conductive member 125. The signal line may include a first path 14 formed in at least a portion of the first PCB 10 and a second path 140 formed in at least a portion of the second PCB 110 of the mmWave antenna module 100. The signal line may be, for example, a conductive line such as a coaxial cable. The first wireless communication circuit 12 may supply current to the feed point for the first radiator 125 using the signal line.

In one embodiment, the second wireless communication circuit 130 of the mmWave antenna module 100 may transmit and/or receive a signal of a second frequency band using the antenna array 120. For example, the second frequency band may include a frequency band of 6 GHz or more. For example, the signal may be mmWave. Hereinafter, the first wireless communication circuit 12 may be referred to as a first wireless communication circuit 12, and the second wireless communication circuit 130 may be referred to as a second wireless communication circuit 130.

Reference numerals of FIG. 1 may be referred to the same configuration as that of FIG. 1, and the same description for the configuration corresponding to that of FIG. 1 may be omitted.

Figure 2:
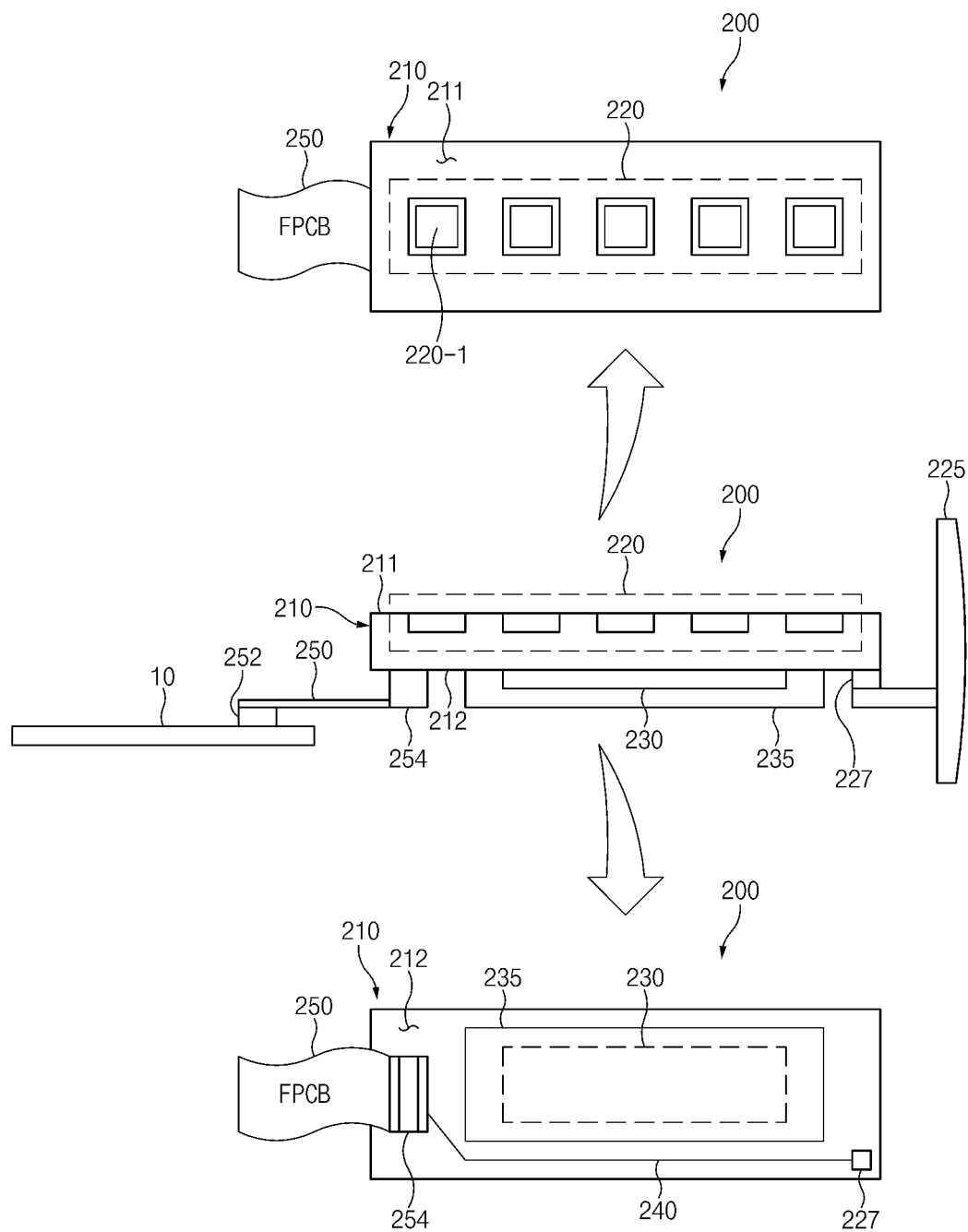
FIG. 2 illustrates schematic diagram of an antenna structure according to an embodiment.

FIG. 2 illustrates a schematic diagram of an antenna structure according to an embodiment.

In one embodiment, the first PCB 10, a mmWave antenna module 200 (e.g., mmWave antenna module 100 of FIG. 1), and a first radiator 225 (e.g., the first radiator 125 of FIG. 1) may form an antenna structure.

In one embodiment, a second PCB 210 may include a first surface 211 facing a first direction and a second surface 212 facing a direction opposite to the first direction. An antenna array 220 may be arranged on the first surface 211 of the second PCB 210 and/or between the first surface 211 and the second surface 212, and a second wireless communication circuit 230 may be disposed on the second surface 212 of the second PCB 210.

Referring to FIG. 2, the antenna array 220 may be formed on the first surface 211 of the second PCB 210. For example, the antenna array 220 may include a plurality of antenna elements. In FIG. 2, a patch antenna element 220-1 is illustrated as an example. However, the type of antenna elements is not limited thereto, and the number of antenna elements included in the antenna array 220 is not limited to the illustrated example.

In one embodiment, the mmWave antenna module 200 may be in contact with or be coupled to the first radiator 225 by a connection member 227. The connection member 227 may be a conductive member. For example, the connection member 227 may be a C-clip or a screw.

In one embodiment, the connection member 227 may include a feed point for the first radiator (or conductive member) 225. The first wireless communication circuit may transmit and/or receive a signal of a first frequency band using the first radiator 225 by feeding a point of the connection member 227. For example, one end of a signal line 240 may be in electrical contact with a point of the connection member 227.

In one embodiment, the signal line 240 may electrically connect a first wireless communication circuit (not shown) (e.g., the first wireless communication circuit 12 of FIG. 1) and a feed point that is a point of the connection member 227 of the first radiator 225. According to an embodiment, the signal line 240 may be formed so as not to overlap the antenna array 220 and the second wireless communication circuit 230 when viewed from above the first surface 211.

In one embodiment, the electronic device 5 may further include a flexible printed circuit board (FPCB) 250 that electrically connects the first PCB 10 and the second PCB 210 of the mmWave antenna module 200. Hereinafter, the flexible printed circuit board 250 may be referred to as the FPCB 250.

In one embodiment, the electronic device 5 may include at least one of connectors 252 and 254 for connecting PCB-PCB or PCB-FPCB. For example, the electronic device 5 may include the connector 252 disposed between the first PCB 10 and the FPCB 250. For example, the electronic device 5 may include the connector 254 disposed between the second PCB 210 and the FPCB 250. In one embodiment, the connectors 252 and 254 may be omitted, and the first PCB 10 or the second PCB 210 may be integrally formed with the FPCB 250.

In one embodiment, the first path of the signal line 240 (e.g., the first path 14 of FIG. 1) may be formed in at least a portion of the FPCB 250. For example, the signal line 240 may be disposed in at least a portion of the first PCB 10 and at least a portion of the FPCB 250. The first path (e.g., the first path 14 of FIG. 1) and the second path (e.g., the second path 140 of FIG. 1) of the signal line 240 may be electrically connected to the connector 254. For example, the signal line 240 may include a third path formed in the connector 254.

In certain embodiments, the mmWave antenna module 200 may include a shield member 235 (e.g., a shield can). For example, the shield member 235 may be formed of a conductive member. The shield member 235 may be disposed to cover at least a portion of the second wireless communication circuit 230.

In one embodiment, the signal line 240 may be formed in a remaining area of the second PCB 210 excluding an area where the antenna array 220, the second wireless communication circuit 230, and the shield member 235 are disposed. The feed point may be one point of the connection member 227.

Figure 3A:
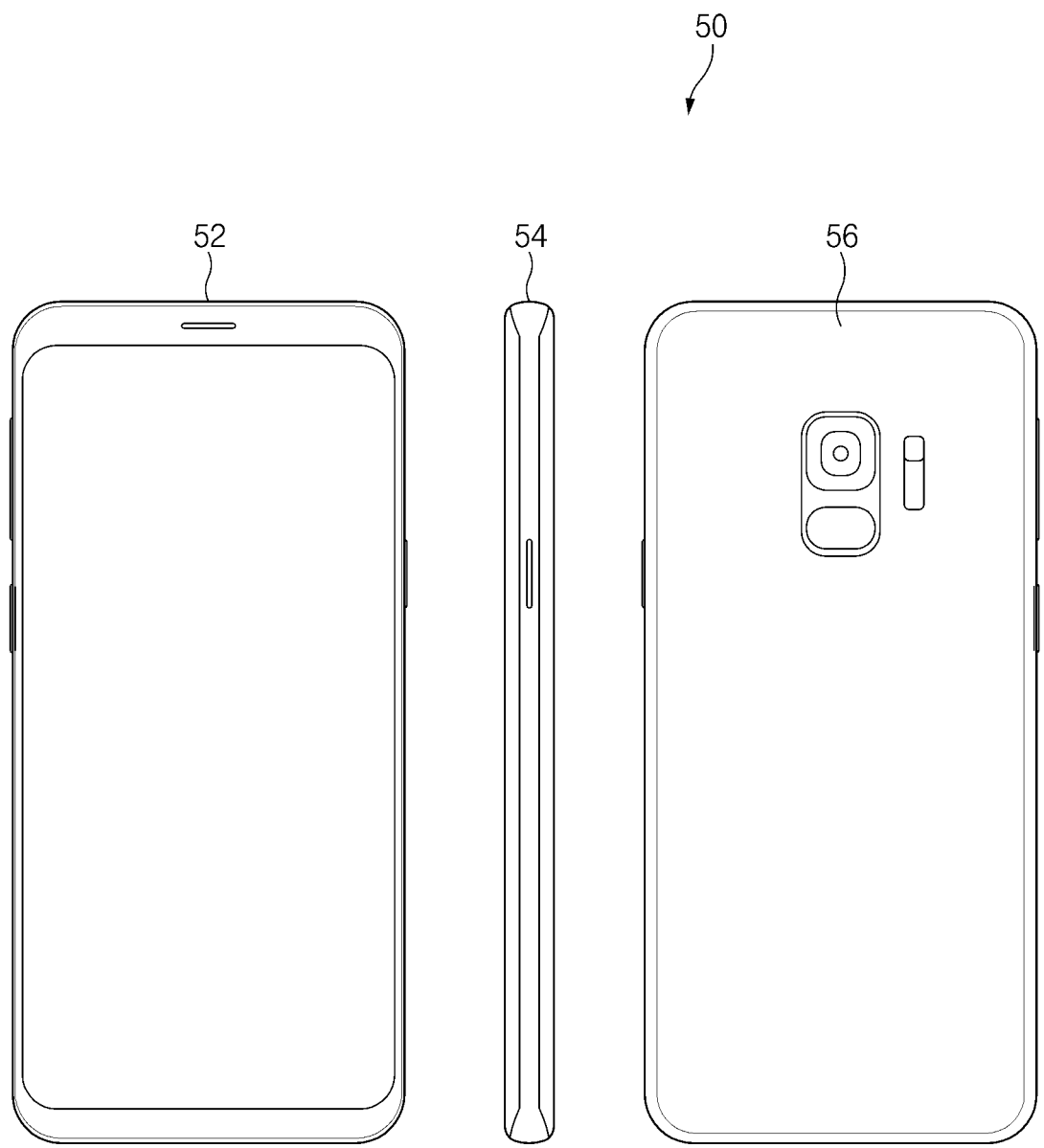
FIG. 3A illustrates a housing of an electronic device according to an embodiment.
Figure 3B:
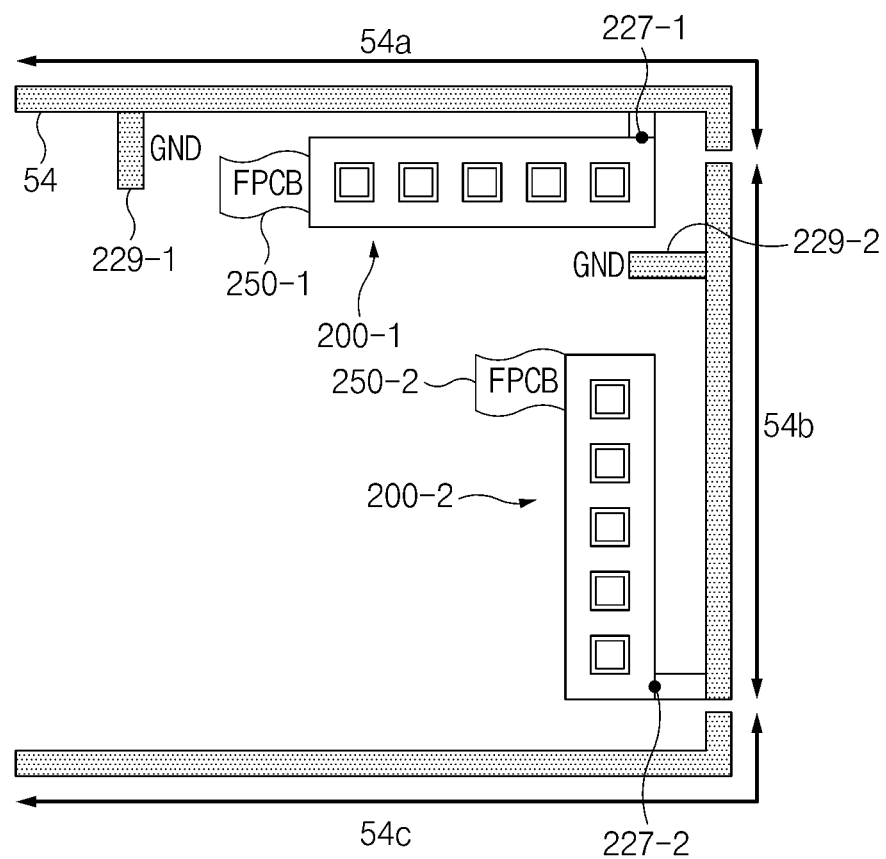
FIG. 3B illustrates a plan view of an inside of an electronic device according to an embodiment.

FIG. 3A illustrates a housing of an electronic device according to an embodiment. FIG. 3B illustrates a plan view of an inside of an electronic device according to an embodiment.

Referring to FIG. 3A, the electronic device 5 may include a housing 50 including a metal region. A first antenna (e.g., an LTE antenna, a sub-5G antenna, a WiFi antenna, or a Bluetooth antenna) may use a portion of the housing 50 as a radiator. For example, a first wireless communication circuit (e.g., the first wireless communication circuit 12 of FIG. 1) of the first antenna may be set to transmit and/or receive a signal of a first frequency band using the metal region of the housing 50 as a first radiator (e.g., the first radiator 225 of FIG. 2).

According to an embodiment, the housing 50 may include a first surface 52, a second surface 56 facing a direction opposite to the first surface 52 and a side surface 54 surrounding the first surface 52 and the second surface 56. In certain embodiments, at least a portion of the housing 50 may include a metal region. For example, the first surface 52 may be understood as a front plate and the second surface 56 may be understood as a back plate. The side surface 54 may be understood as a metal bezel structure. For example, at least a portion of the side surface 54 may operate as the first radiator 225.

Referring to FIG. 3B, the electronic device 5 may include first and second mmWave antenna modules 200-1 and 200-2 (e.g., the mmWave antenna module 200 of FIG. 2). At least one of the first and second mmWave antenna modules 200-1 and 200-2 may include a signal line connecting a wireless communication circuit (e.g., the first wireless communication circuit 12 of FIG. 1) and a feed point for the side surface 54.

The first mmWave antenna module 200-1 may be electrically connected to another PCB in the electronic device 5 (e.g., the first PCB 10 of FIG. 1) through an FPCB 250-1 (e.g., the FPCB 250 of FIG. 2). The second mmWave antenna module 200-2 may be electrically connected to another PCB in the electronic device 5 (e.g., the first PCB 10 of FIG. 1) through an FPCB 250-2 (e.g., the FPCB 250 of FIG. 2). For example, the first mmWave antenna module 200-1 may include a first signal line (e.g., the signal line 240 of FIG. 2) connected to a first feed point 227-1 of a first side surface 54a (e.g., one point of the connection member 227) and a 1-1 wireless communication circuit (e.g., the first wireless communication circuit 12 of FIG. 1). The first side surface 54a may operate as a 1-1 frequency band antenna. A first ground point 229-1 of the first side surface 54a may be electrically connected to a ground area of the electronic device 5. The 1-1 wireless communication circuit may transmit and/or receive a signal of a 1-1 frequency band based on the first feed point 227-1 and at least a portion of the first side surface 54a.

For example, the second mmWave antenna module 200-2 may include a second signal line (e.g., the signal line 240 of FIG. 2) connected to a second feed point 227-2 (e.g., one point of the connection member 227) and a 1-2 wireless communication circuit (e.g., the first wireless communication circuit 12 of FIG. 1). A second ground point 229-2 of a side surface 54b may be electrically connected to a ground area in the electronic device 5. The second side surface 54b may operate as a 1-2 frequency band antenna. The 1-2 wireless communication circuit may transmit and/or receive a signal of a 1-2 frequency band based on the second feed point 227-2, the second ground point 229-2, and at least a portion of the second side surface 54b.

For example, the 1-1 wireless communication circuit and the 1-2 wireless communication circuit may be understood as an RF circuit for at least one different antenna of the first antennas. The 1-1 wireless communication circuit and the 1-2 wireless communication circuit may be implemented, separately, and may be implemented as one integrated communication circuit. The positions of the feed points 227-1 and 227-2 and the ground points 229-1 and 229-2 may be adjusted according to a target frequency of the first antenna. Depending on the adjusted positions of the feed points 227-1 and 227-2 and the ground points 229-1 and 229-2, the length of an electrical path formed on the side surface 54 may vary, and a wireless communication circuit may transmit and/or receive signals of different frequency bands.

In one embodiment, the 1-1 wireless communication circuit and the 1-2 wireless communication circuit may be disposed on a first PCB (not shown) (e.g., the first PCB 10 of FIG. 1). As described above with reference to FIGS. 1 and 2, the first signal line and the second signal line may be disposed on portions of the first and second mmWave antenna modules 200-1 and 200-2, respectively.

Figure 4:
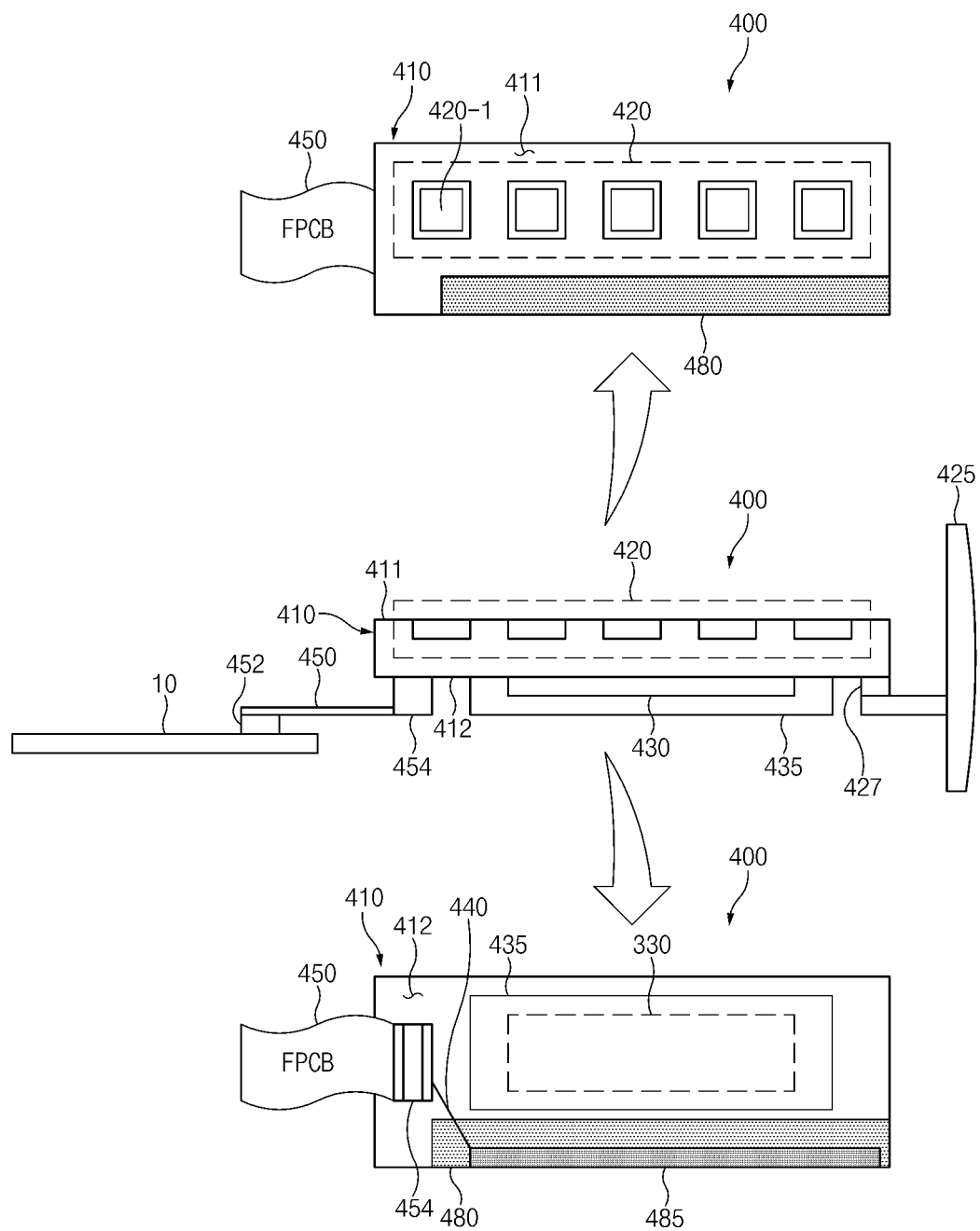
FIG. 4 illustrates an mmWave antenna module including a fill cut area according to an embodiment.

FIG. 4 illustrates an mmWave antenna module including a fill cut area according to an embodiment.

Referring to FIG. 4, the first PCB 10, an mmWave antenna module 400 (e.g., mmWave antenna module 100 of FIG. 1), and a first radiator 425 (e.g., the first radiator 125 of FIG. 1) may form an antenna structure.

In one embodiment, a second PCB 410 may include a first surface 411 facing a first direction and a second surface 412 facing a direction opposite to the first direction. An antenna array 420 may be arranged on the first surface 411 of the second PCB 410 and/or between the first surface 411 and the second surface 412, and a second wireless communication circuit 430 may be disposed on the second surface 412 of the second PCB 410. Referring to FIG. 4, the antenna array 420 may be formed on the first surface 411 of the second PCB 410. For example, the antenna array 420 may include a patch antenna element 420-1.

In one embodiment, the mmWave antenna module 400 may be in contact with or be coupled to the first radiator 425 by a connection member 427. The connection member 427 may be a conductive member. For example, the connection member 427 may be a C-clip or a screw.

In one embodiment, the electronic device (e.g., the electronic device 5 of FIG. 1) may further include a flexible printed circuit board (FPCB) 450 that electrically connects the first PCB 10 and the second PCB 410 of the mmWave antenna module 400. The electronic device 5 may include a connector 452 disposed between the first PCB 10 and the FPCB 450. The electronic device 5 may include a connector 454 disposed between the second PCB 410 and the FPCB 450. In one embodiment, the connectors 452 and 454 may be omitted, and the first PCB 10 or the second PCB 410 may be integrally formed with the FPCB 450.

The mmWave antenna module 400 may include a shield member 435 (e.g., a shield can). For example, the shield member 435 may be formed of a conductive member. The shield member 435 may be disposed to cover at least a portion of the second wireless communication circuit 430.

In one embodiment, at least a portion of the second PCB 410 of the mmWave antenna module 400 (e.g., the mmWave antenna module 100 of FIG. 1) may be a non-conductive area 480 (e.g., a fill-cut area). For example, the non-conductive area 480 may be understood as an area from which a conductive layer included in the second PCB 410 is removed.

In one embodiment, the non-conductive area 480 may be included in a remaining area excluding an area in which the antenna array 420, the second wireless communication circuit 430, and the shield member 435 are disposed. For example, at least a part of a signal line 440 may be disposed on the non-conductive area 480.

In certain embodiments, the non-conductive area 480 may include a conductive pattern 485. The signal line 440 may be electrically connected to the conductive pattern 485. The first wireless communication circuit may feed one point of the conductive pattern 485 through the signal line 440. The conductive pattern 485 may operate as a first frequency band antenna.

In certain embodiments, the first wireless communication circuit may transmit and/or receive a signal of a first frequency band through an electrical path formed in the conductive pattern 485 and the first radiator 425. For example, a first frequency band antenna may include the conductive pattern 485 and the first radiator 425.

Figure 5:
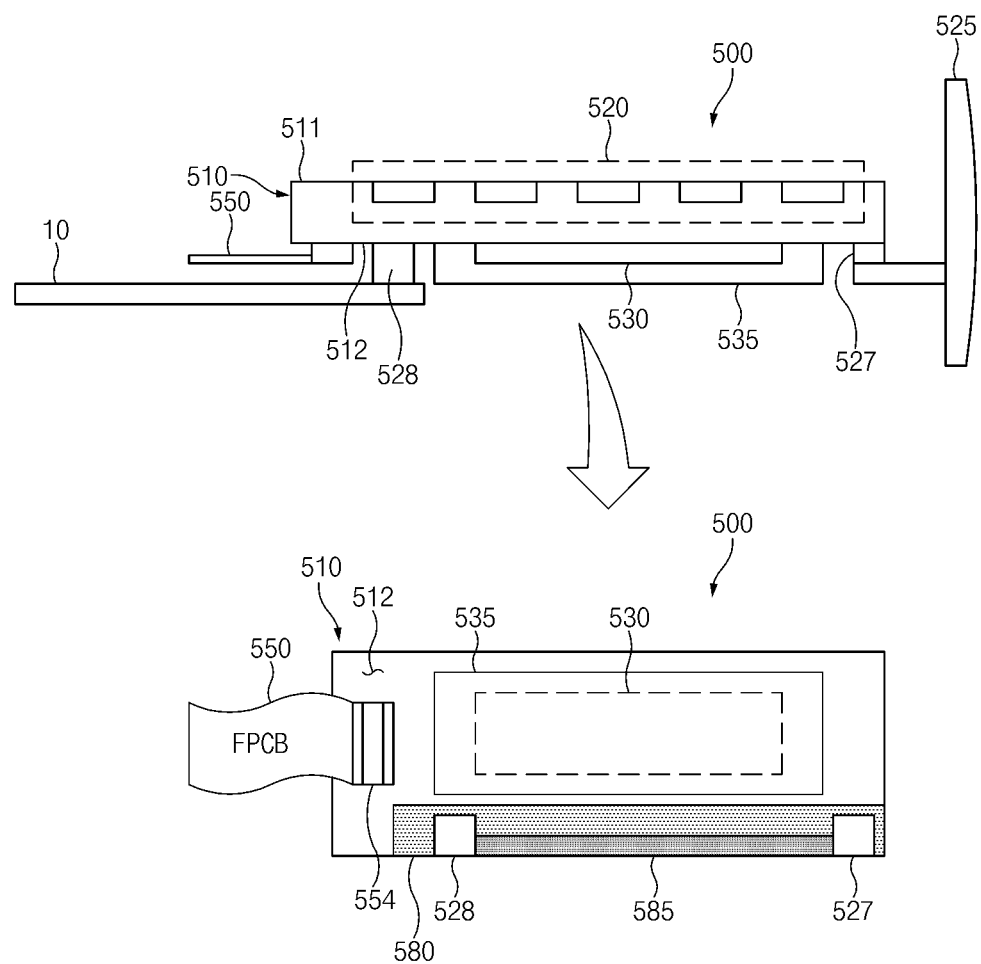
FIG. 5 illustrates a schematic diagram of an antenna structure according to an embodiment.

FIG. 5 illustrates a schematic diagram of an antenna structure according to an embodiment.

Referring to FIG. 5, the first PCB 10, an mmWave antenna module 500 (e.g., the mmWave antenna module 100 of FIG. 1), and a first radiator 525 (e.g., the first radiator 125 of FIG. 1) may form an antenna structure.

In one embodiment, a second PCB 510 may include a first surface 511 facing a first direction and a second surface 512 facing a direction opposite to the first direction. An antenna array 520 may be arranged on the first surface 511 of the second PCB 510 and/or between the first surface 511 and the second surface 512, and a second wireless communication circuit 530 may be disposed on the second surface 512 of the second PCB 510.

In one embodiment, the mmWave antenna module 500 may be in contact with or coupled with the first radiator 525 through a first connection member 527. The first connection member 527 may be a conductive member. For example, the first connection member 527 may be a C-clip or a screw.

In one embodiment, the electronic device (e.g., the electronic device 5 of FIG. 1) may further include a flexible printed circuit board (FPCB) 550 that electrically connects the first PCB 10 and the second PCB 510 of the mmWave antenna module 500. The electronic device 5 may include a connector 554 disposed between the second PCB 510 and the FPCB 550.

The mmWave antenna module 500 may include a shield member 535 (e.g., a shield can). For example, the shield member 535 may be formed of a conductive member. The shield member 535 may be disposed to cover at least a portion of the second wireless communication circuit 530.

In one embodiment, the electronic device (e.g., the electronic device 5 of FIG. 1) may have a conductive pattern 585 electrically connected to the first radiator 525 (e.g., the first radiator 125 of FIG. 1). For example, the first radiator 525 and the conductive pattern 585 may be electrically connected to each other through the first connection member 527 (e.g., the connection member 227 of FIG. 2). The first connection member 527 may be understood as a conductive member. The first connection member 527 may electrically connect the first radiator 525 and the conductive pattern 585.

In one embodiment, the conductive pattern 585 may be disposed in a non-conductive area 580 (e.g., the non-conductive area 480 of FIG. 4) of the second PCB 510. A portion of the second PCB 510 on which the conductive pattern 585 is disposed may be formed as the non-conductive area 580 such that the conductive pattern 585 functions as a radiator.

In one embodiment, a first wireless communication circuit (e.g., the first wireless communication circuit 12 of FIG. 1) electrically connected to the first antenna is may transmit and/or receive a signal of a first frequency band using the first radiator 525 (e.g., the first radiator 125 of FIG. 1) and the conductive pattern 585. An electrical length of the first antenna may be adjusted through the conductive pattern 585, and the first antenna may transmit and/or receive signals of various frequency bands.

In one embodiment, the electronic device may include a second connection member 528 that electrically connects the conductive pattern 585 and the first PCB 10. The second connection member 528 may be understood as a conductive member. The first wireless communication circuit may feed the first antenna through one point (feed point) of the second connection member 528. For example, the first wireless communication circuit may transmit and/or receive a signal of a first frequency band through an electrical path formed on the conductive pattern 585 and the first radiator 525 by performing feeding at the one point of the second connection member 528. A first path (e.g., the first path 14 of FIG. 1) and a second path (e.g., the second path 140 of FIG. 1) of a signal line (not shown) may be formed to extend from the first wireless communication circuit to the feed point of the second connection member 528. For example, the second path may be formed in at least a portion of the second connection member 528 and at least a portion of the second PCB 510.

Figure 6:
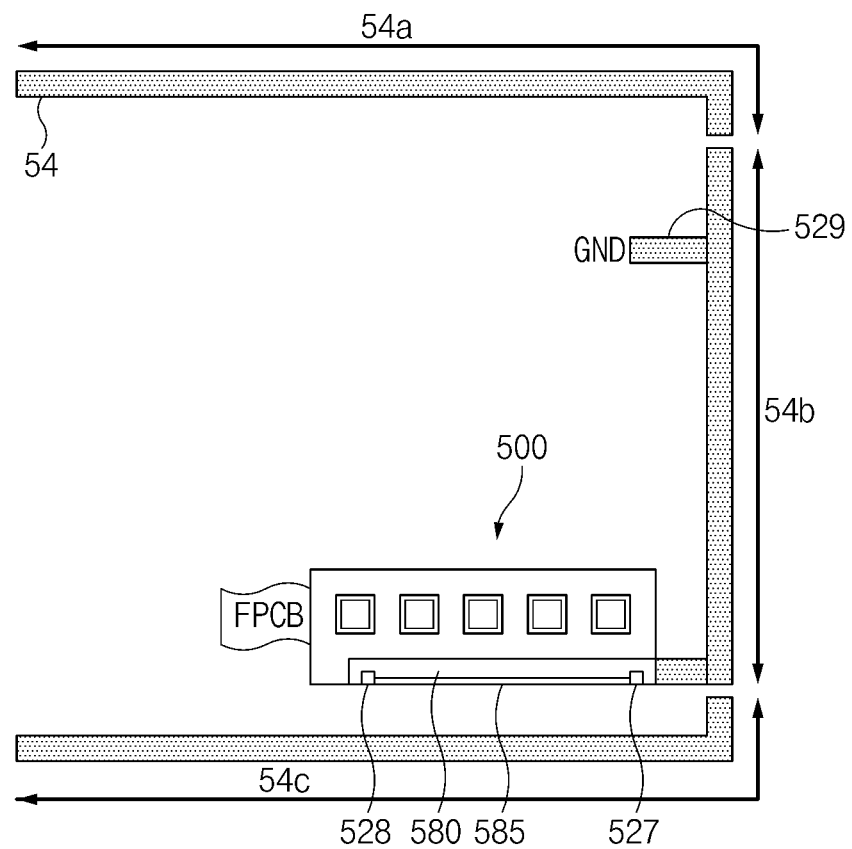
FIG. 6 illustrates a plan view of an inside of an electronic device according to an embodiment.

FIG. 6 illustrates a plan view of an inside of an electronic device according to an embodiment.

In one embodiment, the conductive pattern 585 included in the mmWave antenna module 500 may be electrically connected to at least a portion of the side surface 54 (e.g., the side surface 54 of FIG. 3) of the housing 50 (e.g., housing 50 of FIG. 3A). For example, the side surface 54 may be understood as a metal bezel. In one embodiment, the first wireless communication circuit (e.g., the first wireless communication circuit 12 of FIG. 1) may feed at least a portion of the conductive pattern 585 and the side surface 54 through a feed point, which is one point of the second connection member 528. A ground point 529 of the side surface 54 may be electrically connected to a ground area inside the electronic device 50. The first wireless communication circuit may transmit and/or receive to a signal of a first frequency band using the feed point of the second connection member 528, the ground point 529 of the side surface 54, the conductive pattern 585, and a portion of the side surface 54. The conductive pattern 585 and the portion of the side surface 54 may be understood as the radiator of the first antenna.

Figure 7:
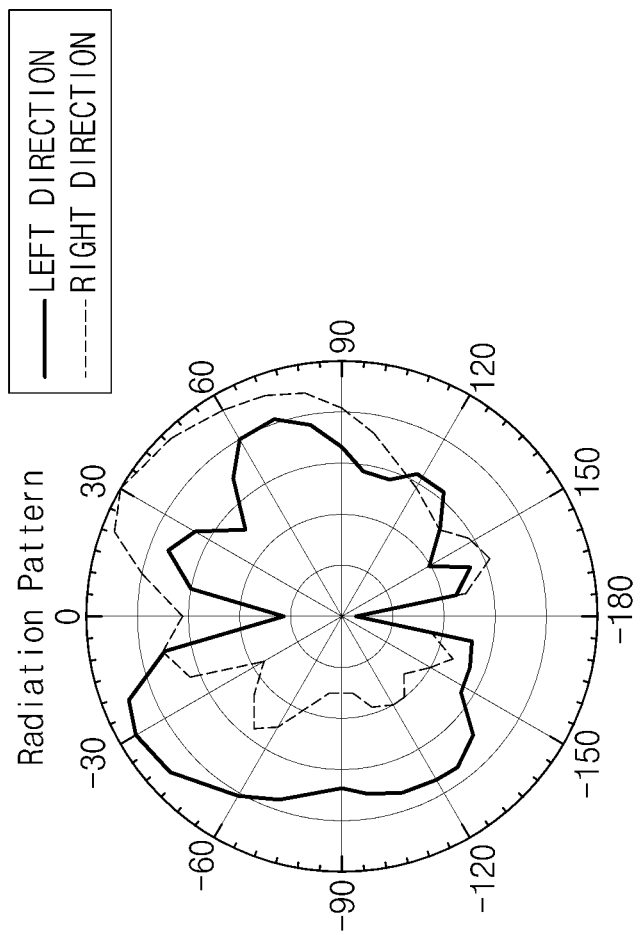
FIGS. 7 and 8 are diagrams illustrating antenna performance of an mmWave antenna module according to an embodiment.
Figure 7:
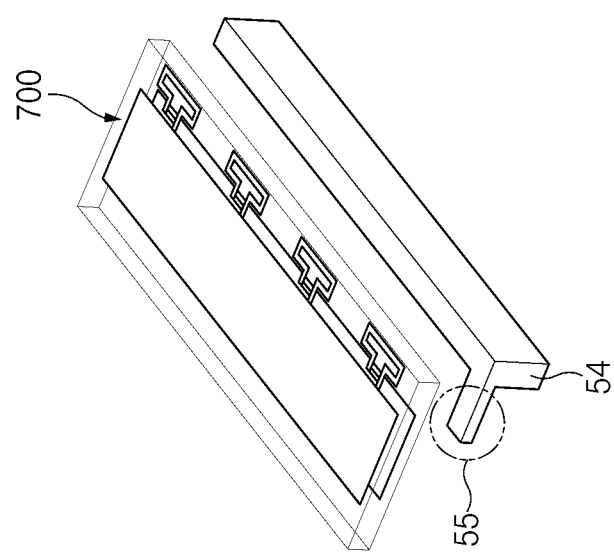
Figure 8:
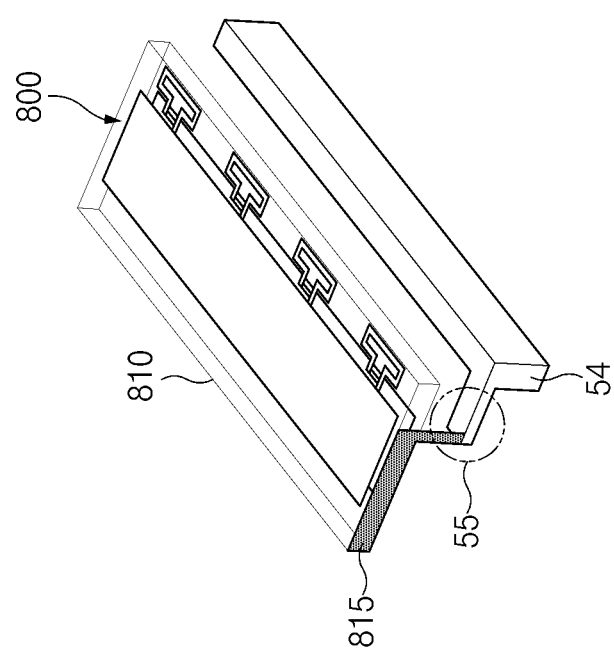
Figure 8:
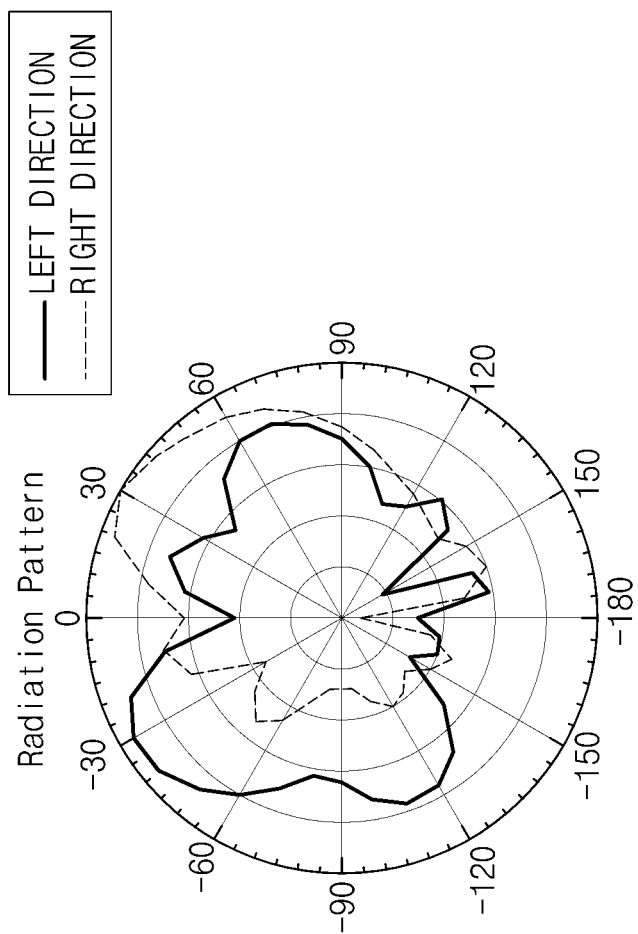

FIGS. 7 and 8 are diagrams illustrating antenna performance of an mmWave antenna module according to an embodiment.

Referring to an antenna structure 1 of FIG. 7, an arrangement structure according to an embodiment is shown in which an mmWave antenna module 700 (e.g., the mmWave antenna module 100 of FIG. 1) and the side surface 54 of the housing (e.g., the side surface 54 of FIG. 3A) are arranged. The side surface 54 may be understood as a metal bezel, for example.

In certain embodiments, the side surface 54 may include a connection portion 55 (e.g., a flange) formed to extend from one point of the side surface 54. The connection portion 55 may be in electrical contact with the mmWave antenna module 700. The side surface 54 and the connection portion 55 may be conductive.

Use of the portion of the mmWave antenna module 700 (e.g., the mmWave antenna module 200 of FIG. 2) as a feed path of the first antenna (e.g., the second path 140 of FIG. 1) or a radiator of the first antenna (e.g., the conductive pattern 585 of FIG. 5) may affect the performance of the mmWave antenna module 700. For example, the connection portion 55 formed of a metal material (e.g., the connection member 227 of FIG. 2 and the first connection member 527 of FIG. 5) may reduce the radiation performance of the mmWave antenna module 700 (e.g., during steering operation).

Referring to radiation pattern polar graph (2) of FIG. 7, the radiation pattern (solid line) when the mmWave antenna module 700 is steered by 30 degrees to the left (in the direction of the connection portion 55) and the radiation pattern (dotted line) when the mmWave antenna module 700 is steered by 30 degrees to the right (in the direction opposite to the connection portion 55).

TABLE 1

| Left Direction | Gain | Right Direction | Gain |
|---|---|---|---|
| Left 30 degrees | 2.75 dB | Right 30 degrees | 4.89 dB |
| Left 40 degrees | 1.55 dB | Right 40 degrees | 4.33 dB |

Referring to Table 1, measurement results of the antenna gain of the mmWave antenna module 700 are described. The antenna gain was measured with respect to a case in which the mmWave antenna module 700 is steered by 30 degrees and 40 degrees in the left direction and a case in which the mmWave antenna module 700 is steered by 30 degrees and 40 degrees in the right direction. When the mmWave antenna module 700 was steered in the right direction, the antenna gain was measured at 4.89 dB, and when the mmWave antenna module 700 was steered in the left direction that is on the side of the connection portion 55, the antenna gain was measured at 2.76 dB. It may be determined that the antenna gain is reduced by about 2 dB due to the connection portion 55. When the steering angle was 40 degrees, a difference in antenna gain between the two cases was measured at 3 dB.

Referring to an antenna structure 1 of FIG. 8, a conductive coating pattern 815 may be formed on one side of a second PCB 810 (e.g., the second PCB 110 of FIG. 1) of an mmWave antenna module 800 (e.g., the mmWave antenna module 100 of FIG. 1) according to an embodiment. For example, the one side of the second PCB 810 may be coated with a conductive material to form the conductive coating pattern 815. In certain embodiments, the conductive coating pattern 815 may improve the performance of the mmWave antenna module 800. The conductive coating pattern 815 may be used as a part of a first frequency band antenna. The conductive coating pattern 815 may be connected to the side surface 54 through the connection portion 55 to form a first frequency band antenna. For example, the conductive coating pattern 815 and the connection portion 55 may be connected to each other through the C-Clip.

For example, the conductive coating pattern 815 may improve steering performance in the left direction. Referring to the radiation pattern graph 2 of the mmWave antenna module 800, it can be seen that the beam pattern in the left direction (solid line) has been improved as compared to the graph 2 of FIG. 7.

TABLE 2

|  | Prior Art | Improvement |
|---|---|---|
| Left 30 degrees | 2.75 dB | 3.55 dB |
| Left 40 degrees | 1.55 dB | 3.16 dB |

Referring to Table 2, when the mmWave antenna module 800 was steered by 30 degrees in the left direction, the antenna gain was measured at 3.55 dB in the case of presence of the conductive coating pattern 815. It can be seen that the antenna gain have been improved by 0.8 dB as compared to the case of absence of the conductive coating pattern 815. It can be seen that the antenna gain has been improved by 1.6 dB when the mmWave antenna module 800 is steered by 40 degrees in the left direction.

Figure 9:
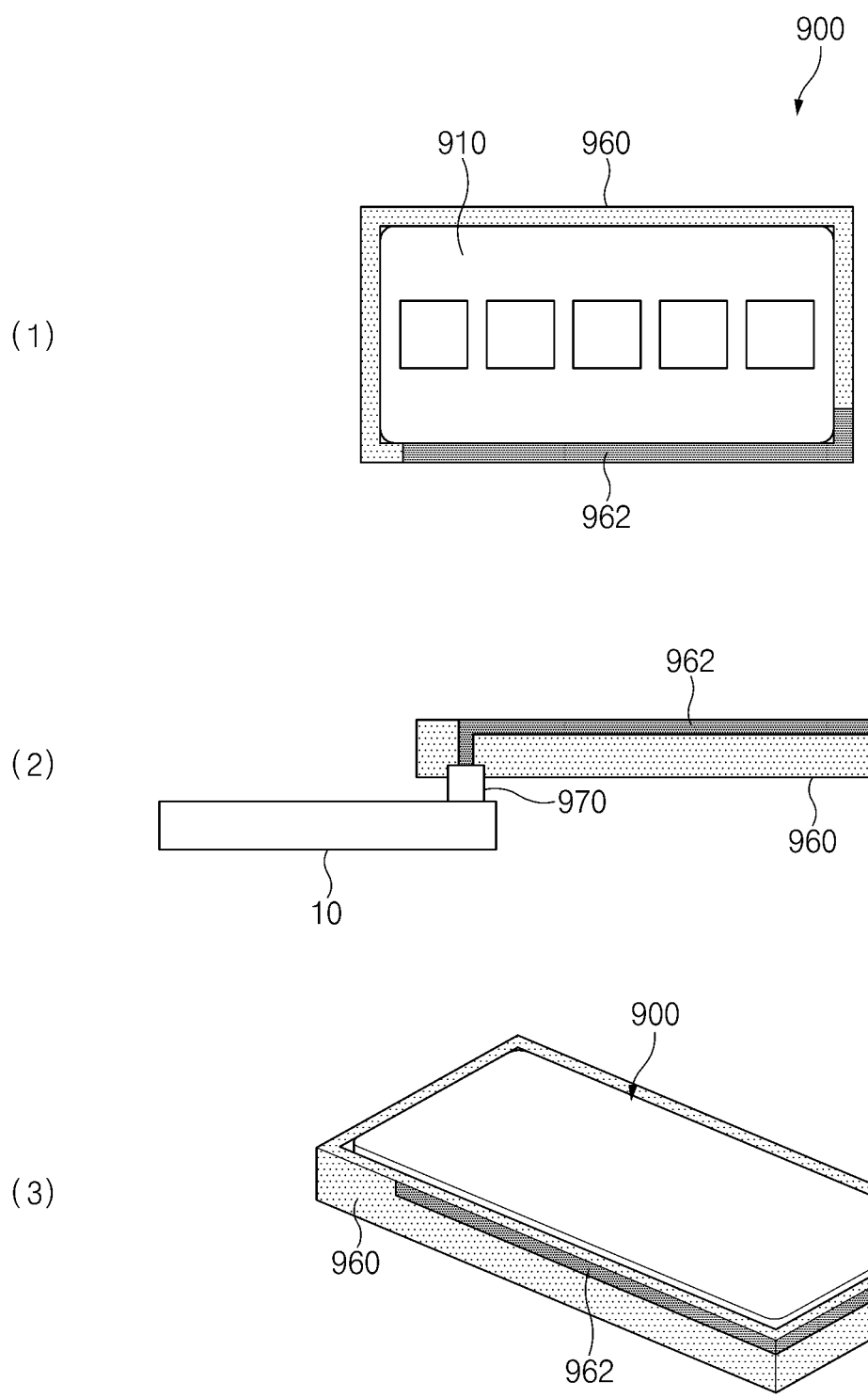
FIG. 9 is a schematic diagram of an antenna structure according to certain embodiments.

FIG. 9 illustrates a schematic diagram of an antenna structure according to certain embodiments.

In certain embodiments, an mmWave antenna module 900 (e.g., the mmWave antenna module 100 of FIG. 1) may include a support member 960. The support member 960 may allow the mmWave antenna module 900 to be fixed at a predetermined position inside the electronic device 5. For example, the support member 960 may be disposed to surround a second PCB 910.

In certain embodiments, the support member 960 may include a conductive pattern 962. The conductive pattern 962 may be electrically connected to a first radiator (not shown) of a first antenna (e.g., the first radiator 125 of FIG. 1). A first wireless communication circuit (e.g., the first wireless communication circuit 12 of FIG. 1) of the first antenna may transmit and/or receive a signal of a first frequency band using a conductive pattern 962 and a first radiator included in the support member 960.

For example, the conductive pattern 962 may be electrically connected to the first PCB 10 (e.g., the first PCB 10 of FIG. 1) through a connection member 970. The connection member 970 may be understood as a conductive connection member such as, for example, a C-clip or a screw. A first wireless communication circuit may feed one point of the connection member 970. For example, the one point of the connection member 970 may be understood as a feed point of the first antenna.

In certain embodiments, the support member 960 may include a feed path (e.g., the signal line 240 of FIG. 2) for the first antenna. In this case, the first antenna may perform feeding through the feed point of the first radiator using the feed path included in the support member 960.

Figure 10:
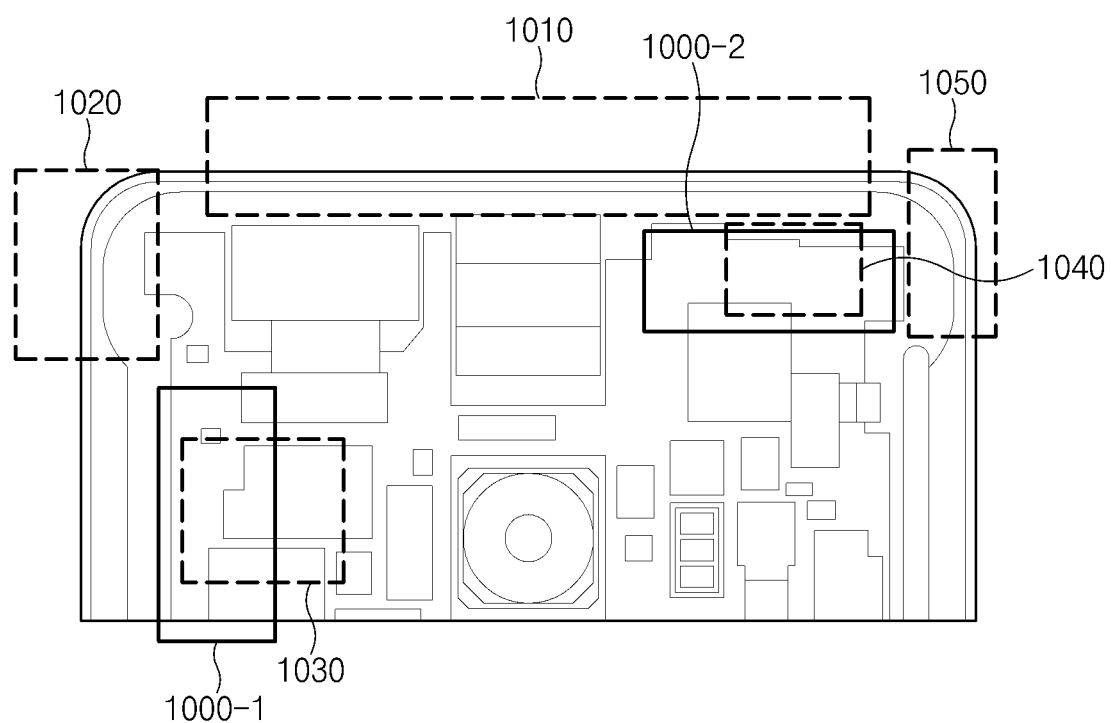
FIG. 10 is a perspective view of an electronic device according to certain embodiments.

FIG. 10 is a perspective view of an electronic device according to certain embodiments.

In certain embodiments, the electronic device 5 may include first and second mmWave antenna modules 1000-1 and 1000-2 and first to fifth antennas 1010, 1020, 1030, 1040, and 1050 (e.g., the first antenna of FIG. 1).

Referring to FIG. 10, a perspective view of the electronic device 5 in the direction of the back plate of the electronic device 5 (e.g., the second surface 56 of FIG. 3A) is shown. For example, the first mmWave antenna module 1000-1 may include a feed path and/or a radiator for the first antenna 1030.

For example, a portion of the back plate on which the first mmWave antenna module 1000-1 is disposed may operate as a radiator of the third antenna 1030. Alternatively, a conductive pattern formed inside the back plate may operate as a radiator of the third antenna 1030. For example, the second mmWave antenna module 1000-2 may include a feed path and/or a radiator for the fourth antenna 1040. For example, a portion of the metal bezel (e.g., the side surface 54 of FIG. 3A) to which the second mmWave antenna module 1000-2 may be disposed adjacent may operate as a radiator of the first antenna 1010, or the fifth antenna 1050. The radiators or feed paths for the first to fifth antennas 1010, 1020, 1030, 1040 and 1050 may be included in the mmWave antenna modules 1000-1 and 1000-2, thus allowing the plurality of antennas to be mounted in a smaller space.

Figure 11:
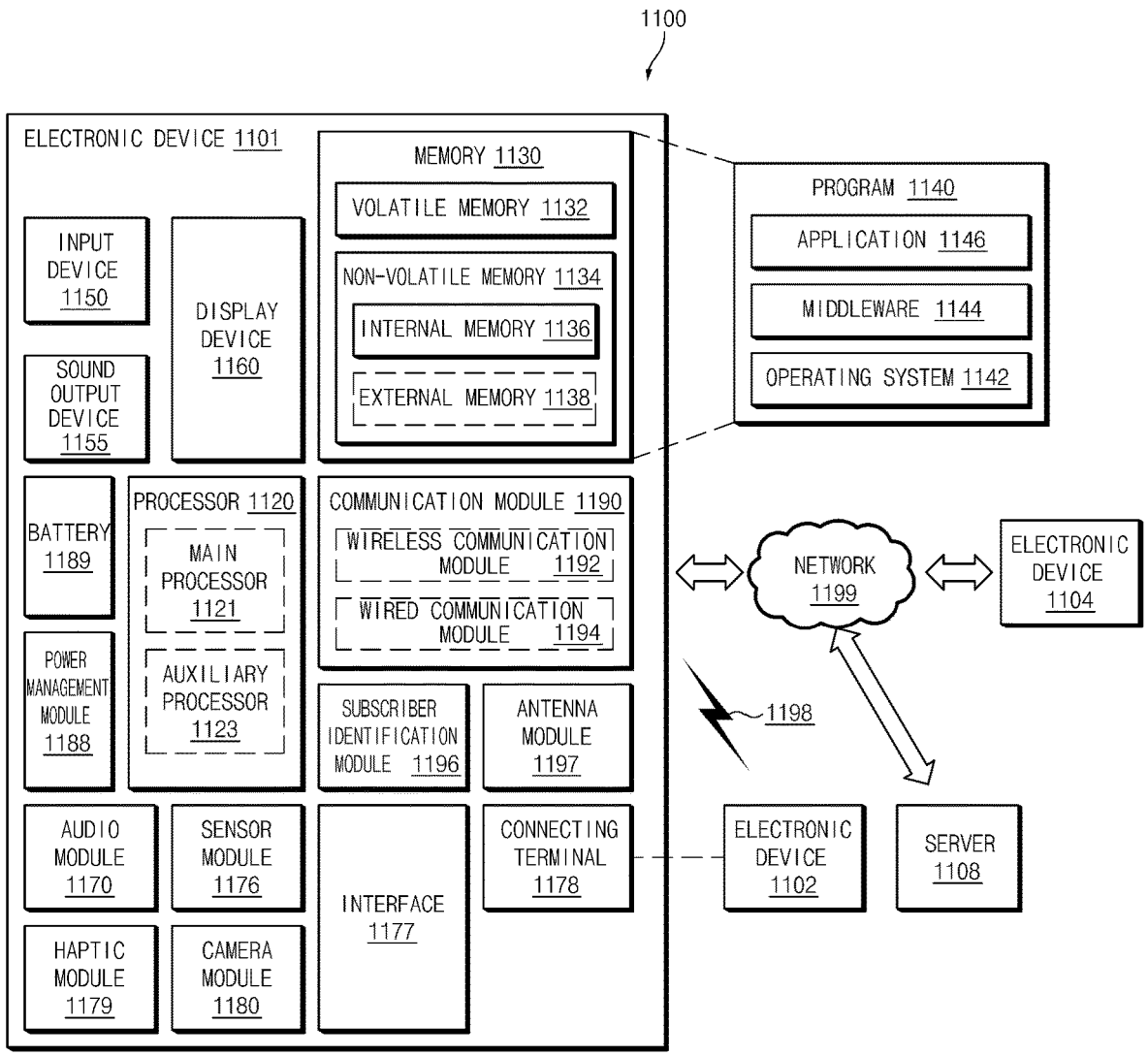
FIG. 11 illustrates an electronic device in a network environment according to certain embodiments.

FIG. 11 is a block diagram of an electronic device 1101 in a network environment 1100, according to certain embodiments. Referring to FIG. 1, the electronic device 1101 in the network environment 1100 may communicate with an electronic device 1102 over a first network 1198 (e.g., a short range wireless communication network) or may communicate with an electronic device 1104 or a server 1108 over a second network 1199 (e.g., a long distance wireless communication network). According to an embodiment, the electronic device 1101 may communicate with the electronic device 1104 through the server 1108. According to an embodiment, the electronic device 1101 may include a processor 1120, a memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module 1196, or an antenna module 1197. In any embodiment, at least one (e.g., the display device 1160 or the camera module 1180) of the components may be omitted from the electronic device 1101, or one or more other components may be further included in the electronic device 1101. In any embodiment, some of the components may be implemented with a single integrated circuit. For example, the sensor module 1176 (e.g., a fingerprint sensor, an iris sensor, or an illumination sensor) may be embedded in the display device 1160 (e.g., a display).

The processor 1120 may execute, for example, software (e.g., a program 1140) to control at least one other component (e.g., a hardware or software component) of the electronic device 1101 connected to the processor 1120, and may perform various data processing or operations. According to an embodiment, as at least a part of the data processing or operations, the processor 1120 may load a command or data received from any other component (e.g., the sensor module 1176 or the communication module 1190) to a volatile memory 1132, may process the command or data stored in the volatile memory 1132, and may store processed data in a nonvolatile memory 1134. According to an embodiment, the processor 1120 may include a main processor 1121 (e.g., a central processing unit or an application processor) and an auxiliary processor 1123 (e.g., a graphic processing device, an image signal processor, a sensor hub processor, or a communication processor), which may be operated independently of or together with the main processor 1121. Additionally or alternatively, the auxiliary processor 1123 may be configured to use lower power than the main processor 1121 or to be specialized for a specified function. The auxiliary processor 1123 may be implemented separately from the main processor 1121 or may be implemented as a part of the main processor 1121.

The auxiliary processor 1123 may control at least a part of a function or states associated with at least one component (e.g., the display device 1160, the sensor module 1176, or the communication module 1190) of the electronic device 1101, for example, instead of the main processor 1121 while the main processor 1121 is in an inactive (e.g., sleep) state and together with the main processor 1121 while the main processor 1121 is in an active (e.g., an application execution) state. According to an embodiment, the auxiliary processor 1123 (e.g., an image signal processor or a communication processor) may be implemented as a part of any other component (e.g., the camera module 1180 or the communication module 1190) which is functionally (or operatively) associated with the auxiliary processor 1123.

The memory 1130 may store various data which are used by at least one component (e.g., the processor 1120 or the sensor module 1176) of the electronic device 1101. The data may include, for example, software (e.g., the program 1140), or input data or output data associated with a command of the software. The memory 1130 may include the volatile memory 1132 or the nonvolatile memory 1134. The nonvolatile memory 1134 may include an internal memory 1136 or an external memory 1138.

The program 1140 may be stored in the memory 1130 as software, and may include, for example, an operating system 1142, a middleware 1144, or an application 1146.

The input device 1150 may receive a commands or data which will be used by a component (e.g., the processor 1120) of the electronic device 1101, from the outside (e.g., a user) of the electronic device 1101. The input device 1150 may include, for example, a microphone, a mouse, or a keyboard.

The sound output device 1155 may output a sound signal to the outside of the electronic device 1101. The sound output device 1155 may include, for example, a speaker or a receiver. The speaker may be used for a general purpose such as multimedia play or recording play, and the receiver may be used to receive an incoming call. According to an embodiment, the receiver may be implemented separately from the speaker or may be implemented as a part of the speaker.

The display device 1160 may visually provide information to the outside (e.g., the user) of the electronic device 1101. The display device 1160 may include, for example, a display, a hologram device, or a control circuit for controlling a projector and a corresponding device. According to an embodiment, the display device 1160 may include a touch circuitry configured to sense a touch, or a sensor circuitry (e.g., a pressure sensor) configured to measure the strength of force generated by the touch.

The audio module 1170 may convert sound to an electrical signal, or reversely, may convert an electrical signal to sound. According to an embodiment, the audio module 1170 may obtain sound through the input device 1150, or may output sound through the sound output device 1155, or through an external electronic device (e.g., the electronic device 1102) (e.g., a speaker or a headphone) directly or wirelessly connected with the electronic device 1101.

The sensor module 1176 may sense an operation state (e.g., power or a temperature) of the electronic device 1101 or an external environment state (e.g., a user state), and may generate an electrical signal or a data value corresponding to the sensed state. According to an embodiment, the sensor module 1176 may include, for example, a gesture sensor, a grip sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 1177 may support one or more specified protocols that may be used to directly and wirelessly connect the electronic device 1101 with an external electronic device (e.g., the electronic device 1102). According to an embodiment, the interface 1177 may include, for example, a high definition multimedia interface (HDMI), a universal serial bus (USB) interface, a secure digital (SD) card interface, or an audio interface.

A connection terminal 1178 may include a connector that may allow the electronic device 1101 to be physically connected with an external electronic device (e.g., the electronic device 1102). According to an embodiment, the connection terminal 1178 may include, for example, a HDMI connector, a USB connector, a SD card connector, or an audio connector (e.g., a headphone connector).

The haptic module 1179 may convert an electrical signal to a mechanical stimulation (e.g., vibration or movement) or an electrical stimulation which the user may perceive through the sense of touch or the sense of movement. According to an embodiment, the haptic module 1179 may include, for example, a motor, a piezoelectric sensor, or an electrical stimulation device.

The camera module 1180 may photograph a still image and a video. According to an embodiment, the camera module 1180 may include one or more lenses, image sensors, image signal processors, or flashes (or electrical flashes).

The power management module 1188 may manage the power which is supplied to the electronic device 1101. According to an embodiment, the power management module 1188 may be implemented, for example, as at least a part of a power management integrated circuit (PMIC).

The battery 1189 may power at least one component of the electronic device 1101. According to an embodiment, the battery 1189 may include, for example, a primary cell not recharged, a secondary cell rechargeable, or a fuel cell.

The communication module 1190 may establish a direct (or wired) communication channel or a wireless communication channel between the electronic device 1101 and an external electronic device (e.g., the electronic device 1102, the electronic device 1104, or the server 1108) or may perform communication through the established communication channel. The communication module 1190 may include one or more communication processors which is operated independently of the processor 1120 (e.g., an application processor) and supports direct (or wired) communication or wireless communication. According to an embodiment, the communication module 1190 may include a wireless communication module 1192 (e.g., a cellular communication module, a short range wireless communication module, or a global navigation satellite system (GNSS) communication module) or a wired communication module 1194 (e.g., a local area network (LAN) communication module or a power line communication module). A corresponding communication module of such communication modules may communicate with an external electronic device over the first network 1198 (e.g., a short range communication network such as Bluetooth, Wi-Fi direct, or infrared data association (IrDA)) or the second network 1199 (e.g., a long distance communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other. The wireless communication module 1192 may verify and authenticate the electronic device 1101 within a communication network, such as the first network 1198 or the second network 1199, by using subscriber information (e.g., international mobile subscriber identity (IMSI)) stored in the subscriber identification module 1196.

The antenna module 1197 may transmit a signal or a power to the outside (e.g., an external electronic device) or may receive a signal or a power from the outside. According to an embodiment, the antenna module 1197 may include one or more antennas, and at least one antenna which is suitable for a communication scheme used in a computer network such as the first network 1198 or the second network 1199 may be selected, for example, by the communication module 1190 from the one or more antennas. The signal or power may be exchanged between the communication module 1190 and an external electronic device through the selected at least one antenna or may be received from the external electronic device through the selected at least one antenna and the communication module 1190.

At least some of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 1101 and the external electronic device 1104 through the server 1108 connecting to the second network 1199. Each of the electronic devices 1102 and 1104 may be a device, the kind of which is the same as or different from a kind of the electronic device 1101. According to an embodiment, all or a part of operations to be executed in the electronic device 1101 may be executed in one or more external devices of the external electronic devices 1102, 1104, or 1108. For example, in the case where the electronic device 1101 should perform any function or service automatically or in response to a request from the user or any other device, the electronic device 1101 may request one or more external electronic devices to perform at least a part of the function or service, instead of internally executing the function or service or additionally. The one or more external electronic devices which receive the request may execute at least a part of the function or service thus requested or an additional function or service associated with the request, and may provide a result of the execution to the electronic device 1101. The electronic device 1101 may process received result as it is or additionally, and may provide a result of the processing as at least a part of the response to the request. To this end, for example, a cloud computing, distributed computing, or client-server computing technology may be used.

An electronic device (e.g., the electronic device 5 of FIG. 1) according to certain embodiments may include a housing (e.g., the housing 50 of FIG. 3A), a conductive member (e.g., the conductive member 225 of FIG. 2) that forms a part of the housing or disposed inside the housing, a first PCB (e.g., the first PCB 10 of FIG. 2) disposed inside the housing, a first wireless communication circuit (e.g., the first wireless communication circuit 12 of FIG. 1) disposed on the first PCB to transmit and/or receive a signal of a first frequency band, an mmWave antenna module (e.g., the mmWave antenna module 200 of FIG. 2) disposed inside the housing, wherein the mmWave antenna module includes a second PCB (e.g., the second PCB 210 of FIG. 2), an antenna array (e.g., the antenna array 220 of FIG. 2) disposed on the second PCB, and a second wireless communication circuit (e.g., the second wireless communication circuit 230 of FIG. 2) disposed on the second PCB to transmit and/or receive a signal of a second frequency band using the antenna array, and at least a portion of the second PCB may include a signal line (e.g., the signal line 240 of FIG. 2) electrically connecting the first wireless communication circuit and a feed point for the conductive member.

According to certain embodiments, the housing (e.g., the housing 50 of FIG. 3A) may include a metal region, and the first wireless communication circuit (e.g., the first wireless communication circuit 12 of FIG. 1) may transmit and/or receive the signal of the first frequency band using the conductive member that is at least a part of the metal region.

According to certain embodiments, the housing (e.g., the housing 50 of FIG. 3A) may include a first surface (e.g., the first surface 52 of FIG. 3A) facing a first direction, a second surface (e.g., the second surface 56 of FIG. 3A) facing a direction opposite to the first direction, and a side surface (e.g., the side surface 54 of FIG. 3A) formed between the first surface and the second surface, and the first wireless communication circuit (e.g., the first wireless communication circuit 12 of FIG. 1) may transmit and/or receive the signal of the first frequency band using the conductive member that is at least a part of the side surface. The electronic device (e.g., the electronic device 5 of FIG. 1) may further include a ground area disposed inside the electronic device, and one point of the side surface (e.g., the side surface 54 of FIG. 3A) may be electrically connected to the ground area, and the first wireless communication circuit (e.g., the first wireless communication circuit 12 of FIG. 1) may transmit and/or receive the signal of the first frequency band using the feed point, the one point on the side surface, and the conductive member.

According to certain embodiments, the electronic device (e.g., the electronic device 5 of FIG. 1) may further include an FPCB (e.g., the FPCB 250 of FIG. 2) configured to electrically connect the first PCB (e.g., the first PCB 10 of FIG. 2) and the second PCB (e.g., the second PCB 210 of FIG. 2), and at least a portion of the FPCB (e.g., the FPCB 250 of FIG. 2) may be connected to the signal line. The electronic device (e.g., the electronic device 5 of FIG. 1) may further include a connector (e.g., the connection member 227 of FIG. 2) disposed between the FPCB (e.g., the FPCB 250 of FIG. 2) and the second PCB (e.g., the second PCB 210 of FIG. 2), and the signal line may be connected to the connector.

According to certain embodiments, wherein the first wireless communication circuit (e.g., the first wireless communication circuit 12 of FIG. 1) may transmit and/or receive the signal of the first frequency band through an electrical path formed in the conductive member by performing feeding at the feed point through the signal line (e.g., the signal line 240 of FIG. 2).

According to certain embodiments, the first frequency band may include at least a part of a frequency band of 6 GHz or less, and the second frequency band may include at least a part of a frequency band of 20 GHz or less.

According to certain embodiments, the second PCB (e.g., the second PCB 210 of FIG. 2) may include a first surface facing a first direction, a second surface facing a direction opposite to the first direction, an antenna array disposed on the first surface, and the second wireless communication circuit disposed on the second surface.

According to certain embodiments, at least a part of the signal line (e.g., the signal line 440 of FIG. 4) may be formed in a non-conductive area (e.g., the non-conductive area 480 of FIG. 4) of the second PCB (e.g., the second PCB 410 of FIG. 4) excluding an area where the antenna array (e.g., the antenna array 420 of FIG. 4) and the second wireless communication circuit (e.g., the second wireless communication circuit 430 of FIG. 4) are disposed. The electronic device (e.g., the electronic device 5 of FIG. 1) may further include a conductive pattern included in the non-conductive area (e.g., the non-conductive area 480 of FIG. 4) and a conductive connection member (e.g., the connection member 427 of FIG. 4) that is in contact with the conductive pattern (e.g., the conductive pattern 485 of FIG. 4) and one point of the conductive member (e.g., the conductive member 425 of FIG. 4) and includes the feed point, and the first wireless communication circuit (e.g., the first wireless communication circuit 12 of FIG. 1) may transmit and/or receive the signal of the first frequency band through an electrical path formed in the conductive member and the conductive pattern by performing feeding through the feed point. The non-conductive area (e.g., the non-conductive area 480) may be s a fill cut area in which a conductive layer forming the second PCB (e.g., the second PCB 410 of FIG. 4) is removed.

According to certain embodiments, the electronic device (e.g., the electronic device 5 of FIG. 1) may further include a conductive pattern (e.g., the conductive pattern 585 of FIG. 5) electrically connected to the conductive member (e.g., the conductive member 525 of FIG. 5), and the first wireless communication circuit (e.g., the first wireless communication circuit 12 of FIG. 1) may transmit and/or receive the signal of the first frequency band through the conductive member (e.g., the conductive member 525 of FIG. 5) and an electrical path formed on the conductive pattern (e.g., the conductive pattern 585 of FIG. 5) by performing feeding though the feed point via the signal line.

According to certain embodiments, the electronic device may further include a conductive connection member that is in electrical contact with one end of the conductive pattern (e.g., the conductive pattern 585 of FIG. 5) and electrically connects the first PCB (e.g., the first PCB 10 of FIG. 5) and the second PCB (e.g., the second PCB 510 of FIG. 5), and the first wireless communication circuit (e.g., the first wireless communication circuit 12 of FIG. 1) may perform feeding to the feed point included in the conductive connection member.

According to certain embodiments, the conductive pattern (e.g., the conductive pattern 585 of FIG. 5) may be disposed in a non-conductive area (e.g., the non-conductive area 580 of FIG. 5) excluding an area in which the antenna array (e.g., the antenna array 520 of FIG. 5) of the second PCB (e.g., the second PCB 510 of FIG. 5) and the second wireless communication circuit (e.g., the second wireless communication circuit 530 of FIG. 5) are disposed. The one end of the conductive pattern may be adjacent to the first PCB (e.g., the first PCB 10 of FIG. 5). The conductive connection member (e.g., the first connection member 527 of FIG. 5) may include a C-clip or a screw.

According to certain embodiments, the mmWave antenna module (e.g., the mmWave antenna module 900 of FIG. 9) may further include a support member (e.g., the support member 960 of FIG. 9) that surrounds the second PCB (e.g., the second PCB 910 of FIG. 9) (the support member includes a conductive pattern electrically connected to the conductive member), and the first wireless communication circuit (e.g., the first wireless communication circuit 12 of FIG. 1) may transmit and/or receive the signal of the first frequency band using the conductive member and the conductive pattern. The electronic device (e.g., the electronic device 5 of FIG. 1) may further include a conductive connection member (e.g., the connection member 970) that is in electrical contact with one end of the conductive pattern, and the first wireless communication circuit (e.g., the first wireless communication circuit 12 of FIG. 1) may perform feeding to the feed point included in the conductive connection member. A portion of the second PCB may include a conductive coating pattern (e.g., the conductive coating pattern 815) and the conductive coating pattern may be disposed adjacent to the conductive member.

An electronic device according to certain embodiments of the present disclosure may be various types of devices. The electronic device may include, for example, a portable communication device (e.g., a smartphone), a computer device, a portable multimedia device, a portable medical device, a camera, a wearable device, or a home appliance device. The electronic device according to embodiments of the present disclosure is not limited to the above-described device.

It should be understood that the certain embodiments of the document and the terminology used are not intended to limit the techniques described in this document to any particular embodiment, but rather to include various modifications, equivalents, and/or alternatives of the embodiments. In connection with the description of the drawings, like reference numerals may be used for similar components. The singular expressions may include plural expressions unless the context clearly dictates otherwise. In this document, the expressions "A or B," "at least one of A and/or B," "A, B or C," or "at least one of A, B, and/Possible combinations. Expressions such as "first", "second" is not limited to those components. When it is mentioned that some (e.g., first) component is "(functionally or communicatively) connected" or "connected" to another (second) component, May be connected directly to the component, or may be connected through another component (e.g., a third component).

As used herein, the term "module" includes a unit of hardware, software or firmware and may be used interchangeably with terms such as, for example, logic, logic blocks, components. A "module" may be an integrally constructed component or a minimum unit or part thereof that performs one or more functions. "Module" may be implemented either mechanically or electronically, for example, by application-specific integrated circuit (ASIC) chips, field-programmable gate arrays (FPGAs) and programmable logic devices. At least some of the devices (e.g., modules or their functions) or methods (e.g., operations) according to certain embodiments may be stored in a computer readable storage medium (e.g., memory 1130). When the instruction is executed by a processor (e.g., processor 1120), the processor may perform a function corresponding to the instruction. The computer-readable recording medium may be a hard disk, a floppy disk, a magnetic medium such as a magnetic tape, an optical recording medium such as a CD-ROM, a DVD, a magnetic-optical medium such as a floppy disk, the instructions may include code generated by the compiler or code that may be executed by the interpreter.

Each of components (e.g., a module or a program) may include a single entity or a plurality of entities; some of the above-described corresponding sub components may be omitted, or any other sub component may be further included in certain embodiments. Alternatively additionally, some components (e.g., a module or a program) may be combined with each other so as to form one entity, so that the functions of the components may be performed in the same manner as before the combination. According to certain embodiments, operations executed by modules, program modules, or other components may be executed by a successive method, a parallel method, a repeated method, or a heuristic method. Alternatively, at least some of the operations may be executed in another order or may be omitted, or any other operation may be added.

According to the embodiments disclosed in the disclosure, it is possible to efficiently arrange the mmWave antenna module and the legacy antenna by using a feed path for the legacy antenna.

According to the embodiments disclosed in the disclosure, the electrical length of the legacy antenna may be adjusted using the conductive pattern included in the antenna module.

In addition, various effects may be provided that are directly or indirectly identified through this document.

While the disclosure has been shown and described with reference to certain embodiments thereof, it will be understood by those skilled in the art that various changes in form and details may be made therein without departing from the scope of the disclosure as defined by the appended claims and their equivalents.

What is claimed is:

1. An electronic device comprising:
  a housing;
  a first PCB disposed inside the housing;
  a first wireless communication circuit disposed on the first PCB to transmit and receive signals of a first frequency band;
  a second PCB disposed inside the housing, wherein the second PCB includes a signal line;
  an antenna array disposed on the second PCB;
  a second wireless communication circuit disposed on the second PCB to transmit and receive signals of a second frequency band using the antenna array; and a conductive member electrically connected to the first wireless communication circuit by the signal line of the second PCB via a feed point for the conductive member.

2. The electronic device of claim 1, wherein the housing includes a metal region, and wherein the conductive member forms a portion of the metal region, and
wherein the first wireless communication circuit is configured to transmit and receive the signals of the first frequency band using the conductive member.

3. The electronic device of claim 1, wherein the housing includes a first surface facing a first direction, a second surface facing a direction opposite to the first direction, and a side surface formed between the first surface and the second surface, wherein the conductive member forms a portion of the side surface, and
wherein the first wireless communication circuit is configured to transmit and receive the signals of the first frequency band using the conductive member.

4. The electronic device of claim 3, further comprising:
a ground area disposed inside the electronic device,
wherein one point of the side surface is electrically connected to the ground area, and
wherein the first wireless communication circuit is configured to transmit and receive the signals of the first frequency band using the feed point, the one point of the side surface, and the conductive member.

5. The electronic device of claim 1, further comprising:
an FPCB electrically connecting the first PCB and the second PCB,
wherein at least a portion of the FPCB is connected to the signal line.

6. The electronic device of claim 5, further comprising:
a connector disposed between the FPCB and the second PCB.
wherein the signal line is connected to the connector.

7. The electronic device of claim 1, wherein the first wireless communication circuit is configured to transmit and receive the signals of the first frequency band through an electrical path formed in the conductive member by feeding the feed point through the signal line.

8. The electronic device of claim 1, wherein the first frequency band includes range of frequencies of 6 GHz or less, and
wherein the second frequency band includes a range of frequencies of between 6 and 20 GHz.

9. The electronic device of claim 1, wherein the second PCB may include a first surface facing a first direction, a second surface facing a direction opposite to the first direction, wherein the antenna array is disposed on the first surface, and the second wireless communication circuit disposed on the second surface.

10. The electronic device of claim 1, wherein at least a part of the signal line is formed in a non-conductive area of the second PCB excluding an area where the antenna array and the second wireless communication circuit are disposed.

11. The electronic device of claim 10, further comprising:
a conductive pattern included in the non-conductive area; and
a conductive connection member configured to be in contact with the conductive pattern and one point of the conductive member and including the feed point, and
wherein the first wireless communication circuit is configured to transmit and receive the signals of the first frequency band through an electrical path formed in the conductive member and the conductive pattern.

12. The electronic device of claim 11, wherein the non-conductive area is a fill cut area in which a conductive layer forming the second PCB is removed.

13. The electronic device of claim 1, further comprising:
a conductive pattern electrically connected to the conductive member,
wherein the first wireless communication circuit is configured to transmit and receive the signals of the first frequency band through an electrical path formed on the conductive pattern and the conductive member through the feed point via the signal line.

14. The electronic device of claim 13, further comprising:
a conductive connection member configured to be in electrical contact with one end of the conductive pattern and electrically connect the first PCB and the second PCB,
wherein the first wireless communication circuit is configured to perform feeding to the feed point included in the conductive connection member.

15. The electronic device of claim 13, wherein the conductive pattern is disposed in a non-conductive area excluding an area in which the antenna array and the second wireless communication circuit of the second PCB are disposed.

16. The electronic device of claim 14, wherein the one end of the conductive pattern is adjacent to the first PCB.

17. The electronic device of claim 14, wherein the conductive connection member includes a C-clip or a screw.

18. The electronic device of claim 1, wherein the further comprising a support member surrounding the second PCB, the support member including a conductive pattern electrically connected to the conductive member,
wherein the first wireless communication circuit is configured to transmit and receive the signals of the first frequency band using the conductive member and the conductive pattern.

19. The electronic device of claim 18, further comprising:
a conductive connection member in electrical contact with one end of the conductive pattern,
wherein the first wireless communication circuit is configured to feed the feed point included in the conductive connection member.

20. The electronic device of claim 1, wherein a portion of the second PCB includes a conductive coating pattern, and
wherein the conductive coating pattern is disposed adjacent to the conductive member.

* * * * *